US009569545B2

(12) United States Patent
Newey et al.

(10) Patent No.: US 9,569,545 B2
(45) Date of Patent: Feb. 14, 2017

(54) ENHANCING PRODUCT SEARCH ENGINE RESULTS USING USER CLICK HISTORY

(75) Inventors: Neville Rhys Newey, Pleasanton, CA (US); Justin Van Winkle, San Jose, CA (US)

(73) Assignee: eBay Inc., San Jose, CA (US)

(*) Notice: Subject to any disclaimer, the term of this patent is extended or adjusted under 35 U.S.C. 154(b) by 281 days.

(21) Appl. No.: 13/601,665

(22) Filed: Aug. 31, 2012

(65) Prior Publication Data

US 2014/0067786 A1 Mar. 6, 2014

(51) Int. Cl.
*G06F 17/30* (2006.01)
(52) U.S. Cl.
CPC .............. *G06F 17/30867* (2013.01)
(58) Field of Classification Search
None
See application file for complete search history.

(56) References Cited

U.S. PATENT DOCUMENTS

| 7,249,126 | B1 * | 7/2007 | Ginsburg .......... G06F 17/30864 707/749 |
| 7,991,646 | B2 | 8/2011 | Lewis et al. |
| 8,209,331 | B1 * | 6/2012 | Garg .................. G06F 17/30067 707/734 |
| 8,515,975 | B1 * | 8/2013 | Federici ........................ 707/751 |
| 8,589,429 | B1 * | 11/2013 | Thirumalai ......... G06F 17/3064 707/729 |
| 8,619,111 | B2 | 12/2013 | Roach, Jr. |
| 2004/0117740 | A1 * | 6/2004 | Chen ............................. 715/210 |
| 2005/0131799 | A1 | 6/2005 | Clay et al. |
| 2005/0283473 | A1 * | 12/2005 | Rousso ............... G06F 17/3064 |
| 2008/0109422 | A1 * | 5/2008 | Dedhia ............................ 707/5 |
| 2011/0119268 | A1 * | 5/2011 | Rajaram et al. ............. 707/737 |
| 2011/0264665 | A1 * | 10/2011 | Mital ................ G06F 17/30867 707/741 |
| 2012/0239646 | A1 * | 9/2012 | Bailey et al. ................. 707/733 |
| 2013/0226950 | A1 * | 8/2013 | Ciaramita et al. ............ 707/765 |

* cited by examiner

*Primary Examiner* — Charles Adams
(74) *Attorney, Agent, or Firm* — Schwegman, Lundberg & Woessner, P.A.

(57) ABSTRACT

In an example embodiment, previous search queries and clicked-on results are retrieved. This results in one or more pairs, each pair containing a query from the search term database and a first set of search engine results from the click database. Then a score is calculated for each feature within the one or more pairs, and a second set of search queries is boosted using the scores for the features.

17 Claims, 16 Drawing Sheets

| Search Term | Product ID |
|---|---|
| tv | 5741702 |
| tv | 4433011 |
| tv | 3632269 |
| tv | 3756562 |
| tv | 3593545 |

| Feature |
|---|
| tuners |
| colors |
| 716829981214 |
| pixels |
| reproduction |
| enables |
| widescreen |

*FIG. 8*

| Search Term | Product ID |
|---|---|
| tv | 22211528 |
| tv | 23515573 |
| tv | 23515080 |
| tv | 22404734 |
| tv | 22404534 |

*FIG. 9*

| Sample of Features for Product 22211528 |
|---|
| sauvignon |
| tv |
| 4 |
| pk |
| blanc |
| gallo |
| 187 |

*FIG. 10*

| Feature | Probability in Clicked Products |
|---------|-------------------------------|
| hdtv | 0.98 |
| tv | 0.97 |
| hdmi | 0.90 |
| 1080p | 0.88 |
| sound | 0.84 |
| video | 0.83 |
| lcd | 0.83 |
| full | 0.82 |
| picture | 0.80 |
| screen | 0.78 |

*FIG. 11*

| Feature | Probability in Result |
|---|---|
| tv | 0.80 |
| 1 | 0.30 |
| features | 0.27 |
| 2 | 0.25 |
| product | 0.25 |
| up | 0.24 |
| 3 | 0.20 |
| 4 | 0.19 |
| tvs | 0.19 |
| stand | 0.18 |

*FIG. 12*

| PMI | Feature |
|---|---|
| 9.70 | intensity |
| 9.55 | in-out |
| 9.13 | crisper |
| 9.02 | shades |
| 8.96 | twice |
| 8.90 | wasting |
| 8.90 | smoother |
| 8.90 | phono |
| 8.90 | optimizing |
| 8.90 | haze |

*FIG. 13*

| NPMI | Feature |
|---|---|
| 0.99 | hdtv |
| 0.96 | 1080p |
| 0.96 | hdmi |
| 0.94 | full |
| 0.93 | image |
| 0.93 | lcd |
| 0.93 | widescreen |
| 0.93 | sound |
| 0.92 | delivers |
| 0.92 | pictur |

*FIG. 14*

| NPMI | Feature |
|---|---|
| -0.54 | clean |
| -0.55 | years |
| -0.57 | disc |
| -0.64 | d |
| -0.65 | top |
| -0.69 | components |
| -0.70 | assembly |
| -0.72 | finish |
| -0.76 | a/v |
| -0.84 | h |

*FIG. 15*

ENHANCING PRODUCT SEARCH ENGINE RESULTS USING USER CLICK HISTORY

TECHNICAL FIELD

This application relates to the technical fields of search engines. Specifically, this application relates to enhancing product search engine results using user click history.

BACKGROUND

Search engines search collections of documents and return a list of documents relevant to a search query. While general Internet search engines, such as Google, Bing, Yahoo! Search, etc. come to mind when discussing search engines, search engines can be more narrowly tailored. For example, a search engine may be designed just to focus on retrieving product listings, and the query can be tailored to best retrieve product information. Many search processes common in search engines provide for more meaningful results by examining information about the document more than simply whether or not the document contains a particular keyword. Specifically, it is common for search engines to examine how commonly the document is linked by other documents in its index, for a measurement of popularity that can then be used to weight the results. When applying such a technique to products, and more particularly to documents pertaining to products (such as product web pages), however, a problem can be encountered in that documents related to newer products, which would have few or no references from other documents due merely to their newness, are unfairly penalized. This despite the fact that in many cases a newer product web page is actually more desirable a search result to a user than an older product web page.

BRIEF DESCRIPTION OF DRAWINGS

FIG. 7 depicts the first 5 pairs in accordance with an example embodiment.

FIG. 8 depicts a sample of extracted features in accordance with an example embodiment.

FIG. 9 depicts a sample of simulated search engine results in accordance with an example embodiment.

FIG. 10 depicts a sample of features gathered for a first product a simulated search set in accordance with an example embodiment.

FIG. 11 depicts example values in accordance with an example embodiment.

FIG. 12 depicts features with the highest probability of appearing in a total search result in accordance with an example embodiment.

FIG. 13 depicts the top 10 terms ordered by pointwise mutual information in accordance with an example embodiment.

FIG. 14 depicts the top 10 values of normalized scores in accordance with an example embodiment.

FIG. 15 depicts the bottom 10 values of normalized scores in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, an algorithm is provided for finding the most likely associated search terms for a user product search. The algorithm may be capable of generalizing the associated terms to make the search relevant for new and even future products, even though they may not have been seen by any users yet. In an example embodiment, no attempts are made to rank product against each other in terms of importance. Rather, the system attempts to boost results that contain terms that are more likely to be "associated" with terms a user entered. This algorithm is robust enough that it requires very little data to make large improvements on the quality of the arch result. In addition, in one example embodiment, the algorithm is able to identify associated search terms from data from other search engines, which can be applied to any other search engine.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

Figure 1:
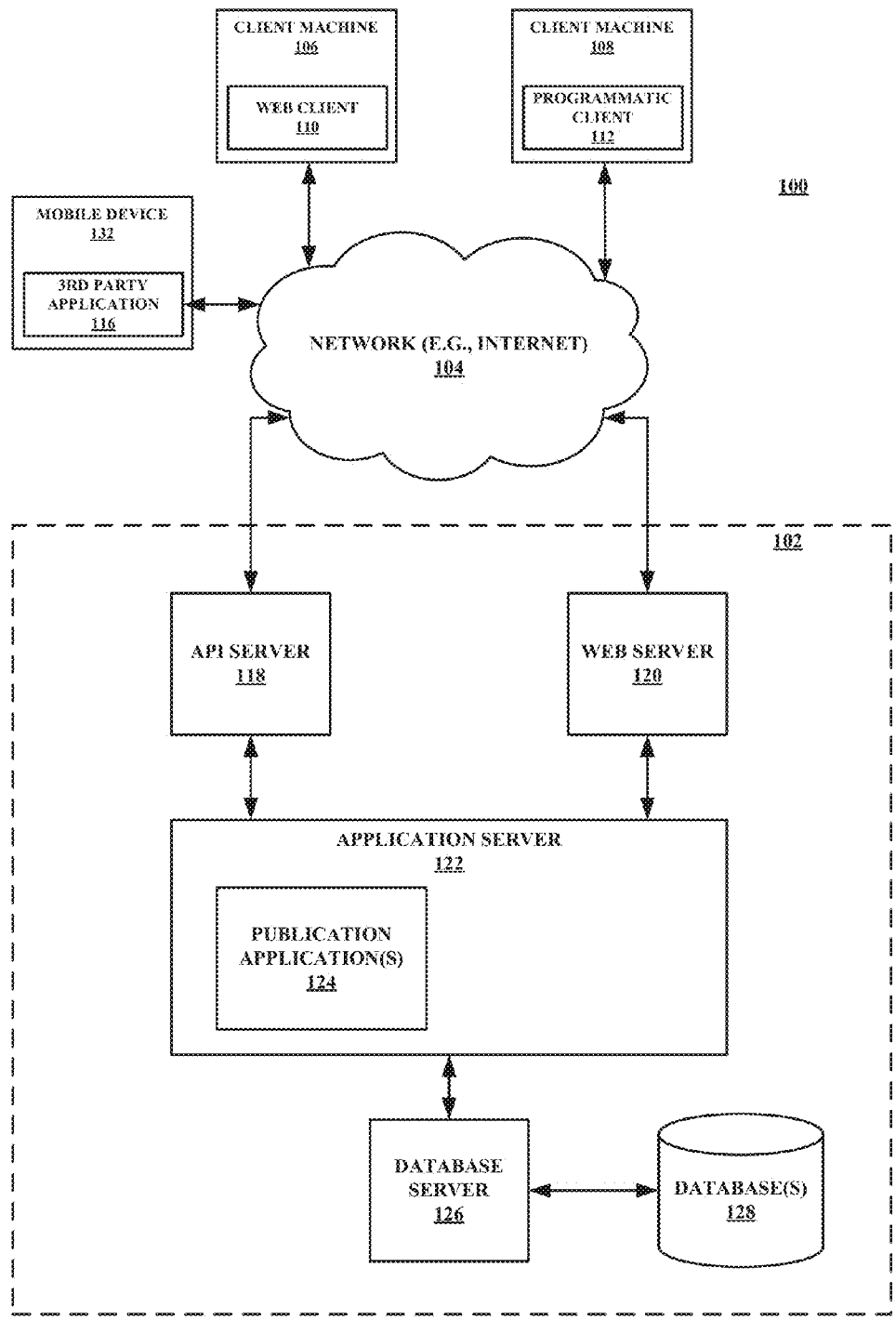
FIG. 1 is a network diagram depicting a networked or network based system, according to an example embodiment, having a client-server architecture configured for exchanging data over a network.

FIG. 1 is a network diagram depicting a networked or network based system, according to an example embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The tris may also be associated with a client machine 108 using a programmatic client 112, such as a client application, or a third party server or a mobile device 132 hosting a third party application 116. It can be appreciated in various embodiments the client machine 106, 108, or third party application 116 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include a third party application 116 (or a web client 110) configured to communicate with application server 122. Although only one mobile device 132 is shown, it will be appreciated that in practice there may be many mobile devices 132. That is, as used herein, the term "mobile device 132" may include plural mobile devices 132, depending on context. In some instances herein, the mobile device 132 may be referred to as a "user device." Further, as is well known in the art, the mobile devices 132, and non-mobile devices as well, may be in contact with a GPS (global positioning system) or other suitable technology for determining the location of such devices and the incentives may be based on both the number of mobile devices 132 and non-mobile devices within the geographic locale.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., programmatic client 112 or third party application 116) running on another client machine (e.g., client machine 108 or a third party server).

The publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users.

FIG. 1 also inns rates a third party application 116 that may execute on a third party server and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, and listing and price-setting mechanisms whereby a user may be a seller or buyer who lists or buys goods and/or services (e.g., for sale) published by the network-based publisher 102.

In an example embodiment, documents related to products are ranked in order of relevance to the user's search query based on historical click information for similar queries. When users search for documents related to products they often just use one or two search terms, for example "speaker". There are many documents related to products that can match such search terms, but the user is often only interested in a few of them. For example, a search for "speaker" may return not just actual speakers but also speaker cables, speaker stands, speaker covers, etc. By analyzing the recorded history of previous user behavior it is possible to derive a process that is capable of ordering the documents relating to products in such a way that the most likely to be relevant documents (for example, documents relating to actual speakers) appear highest in the ordering.

In an example embodiment, a system of recording user queries is provided. This system also then records the subsequent product web pages the users choose to click on. After recording these queries and clicks for some time in a database or other computer storage, the data may be analyzed. A method can then construct two sets of product web pages—those that are returned by a raw search engine search, and those product web pages that are selected specifically based on user click history. Assuming no change in the product set, the second set of product web pages would be smaller than or equal to the size of the first set. Next, the features of all product web pages in both sets are extracted. A feature is a characteristic of a product that is known to the system. Examples include title, description, specifications, global trade item number (GTIN), brand, manufacturer, model number, manufacturer part number (MPN), and category. For one or more of the features, a score is computed which is based on the normalized pointwise mutual information of that feature. At query time, the top features, ordered by their scores, are added to the query as boost terms, or additional terms that will help narrow the results of the query when submitted to the search engine.

In another example embodiment, the system is able to use data from external search engines. Even though external systems may not have identical product web pages with identical features, users generally still use the same queries when looking for similar products. For example, if looking for a speaker, the user will generally run the search term "speaker" on whatever search engine the user is using, and probably would click on similar results. As such, the features from the external site would overlap with the features from the target site, and thus the same scores can be computed.

Figure 2:
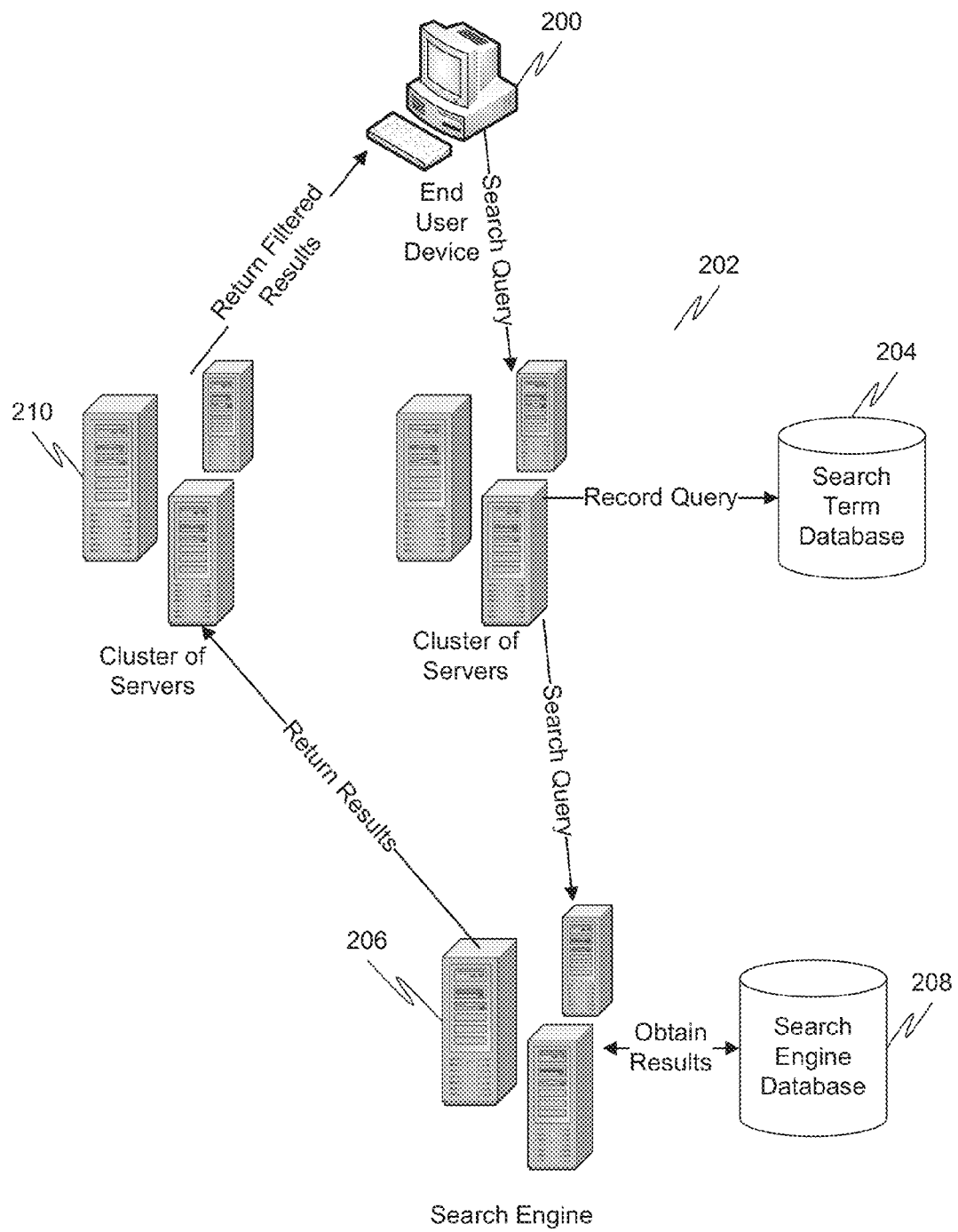
FIG. 2 is a block diagram illustrating a system for recording search history in accordance with an example embodiment.

FIG. 2 is a block diagram illustrating a system for recording search history in accordance with an example embodiment. This diagram depicts how the user search history is recorded. An end user device 200 sends a search query to a cluster of servers 202. This may be accomplished by, for example, entering search terms in a text box of a user interface running on the end user device 200. This user interface may be, for example, a web page executing in a web browser, or a standalone application. The cluster of servers 202 then records the search terms in a search term database 204. The cluster of servers 202 then also sends the search terms to a search engine 206. The search engine 206 is depicted as another cluster of servers. These servers may either be the same or different servers than those described earlier as cluster of servers 202. The search engine 206 then obtains results from an index stored in a search engine database 208, and returns these results to another cluster of servers 210, which may apply various filters or transforms on the results, such as ranking or ordering the results, and removing certain results (e.g., potentially offensive results). It should be noted that while this figure depicts these tasks as being performed by cluster of servers 210, in some example embodiments the filters and transforms can be performed by the search engine 206 itself. Nevertheless, the end result is that the end user receives ordered search engine results (corresponding to products), while the user's search terms have been stored in the search term database 204.

Figure 3:
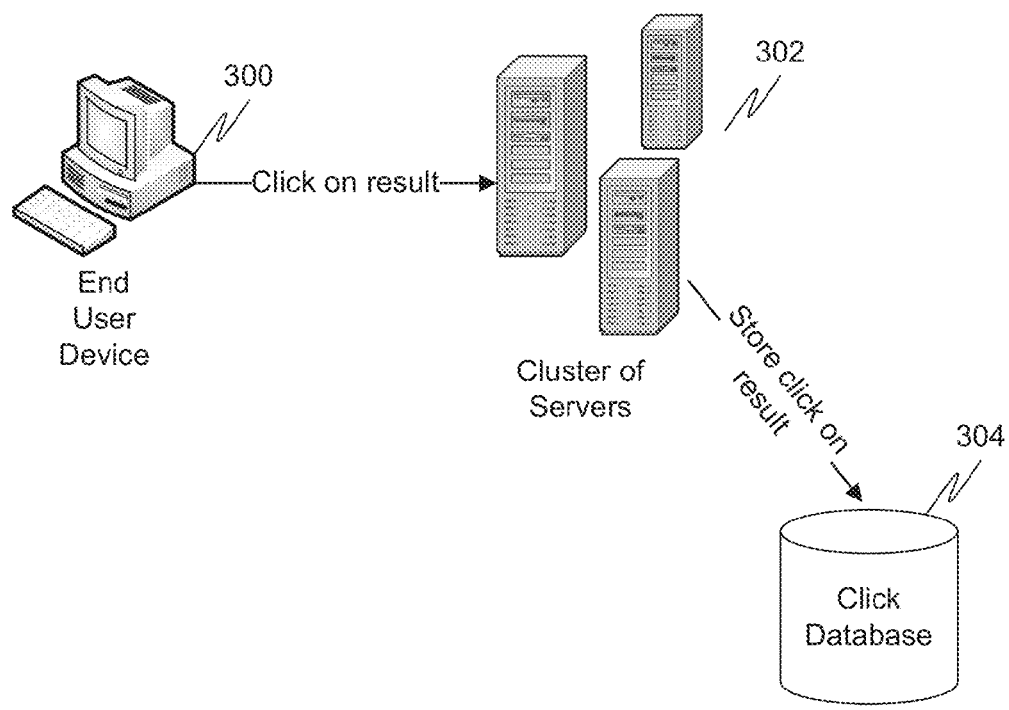
FIG. 3 is a block diagram illustrating a system for recording result clicks in accordance with an example embodiment.

FIG. 3 is a block diagram illustrating a system for recording result clicks in accordance with an example embodiment. This diagram depicts how the system reacts when the end user device actually utilizes the search engine results. Specifically, when end user device 300 (which has the previously obtained search engine results) clicks on one of the results (e.g., selects a product), the clicked-on result is sent to a cluster of servers 302. Again, this cluster of servers 302 may or may not overlap with the previously described clusters of servers. The cluster of servers 302 then stores the clicked-on result in a click database 304.

It should also be noted that while the various databases 204, 208, and 304 depicted in FIGS. 2-3 are depicted as separate servers, in some example embodiments one or more of them may be shared databases and/or share hardware resources.

Figure 4:
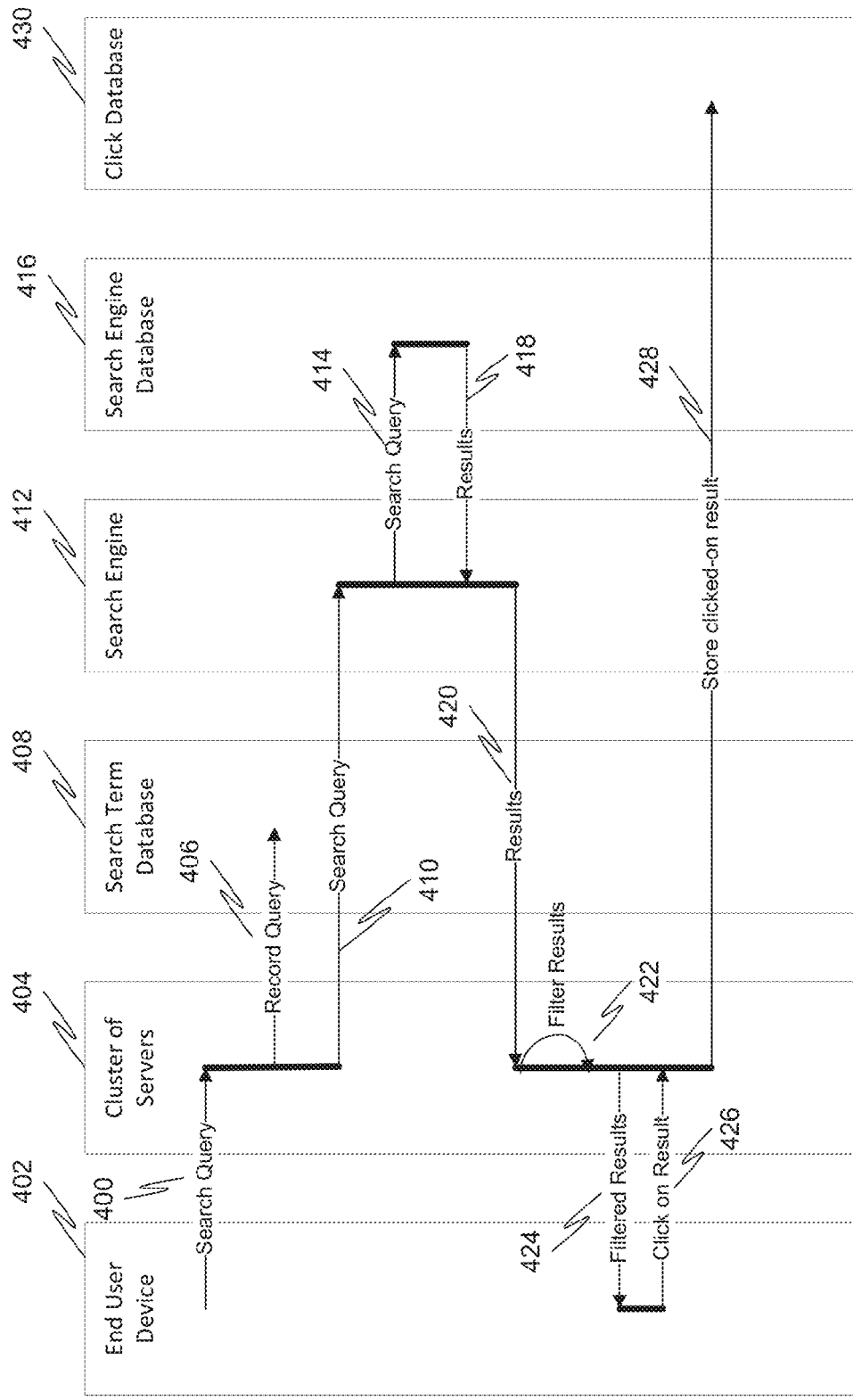
FIG. 4 is an interaction diagram illustrating recording user search history and result clicking in accordance with an example embodiment.

FIG. 4 is an interaction diagram illustrating recording user search history and result clicking in accordance with an example embodiment. This figure depicts aspects similar to that as described above with reference to FIGS. 2-3, however in this example embodiment there is only a single cluster of servers that is used to record both search history and clicking history. While these are depicted as being stored in separate databases, in some embodiments the database can be shared.

At 400, an end user device 402 sends a search query to a cluster of servers 404. This may be accomplished by, for example, entering search terms in a text box of a user interface running on the end user device 400. At 406, the cluster of servers 404 then records the search terms in a search term database 408. At 410, the cluster of servers 404 then also sends the search terms to a search engine 412. At 414, the search engine 412 then obtains results from an index stored in a search engine database 416 by sending a search query to the search engine database 416. At 418, the search engine database 416 returns the results. At 420, the search engine 412 returns these results to the cluster of servers 404, which may apply various filters or transforms on the results at 422, such as ranking or ordering the results, and removing certain results (e.g., potentially offensive results). At 424, the cluster of servers 404 returns the filtered results to the end user device 402. At 426, the user clicks on a result, which is transmitted to the cluster of servers 404. At 428, the cluster of servers then stores the clicked-on result in click database 430.

The above depicts how the user click history is recorded. Referring back to FIG. 2, at a later time, the system may retrieve the search terms from the search term database 204 and the clicked-on results from the click database 304 of FIG. 3 and perform various tasks on them in order for them to be used to help boost future search engine results. These boosts can be incorporated into the search engine (either stored in the search engine database 208, or another database). When a search is conducted by a user, the cluster of servers 202 receives the search terms, and may first lookup boost term scores in the search term database 204. If term scores are found then these terms with their boost scores are added to the user query and the new query in its entirety is sent to the search engine 206. The results from the search engine 206 are then passed back to the end user's device. This process is completely transparent to the user.

Figure 5:
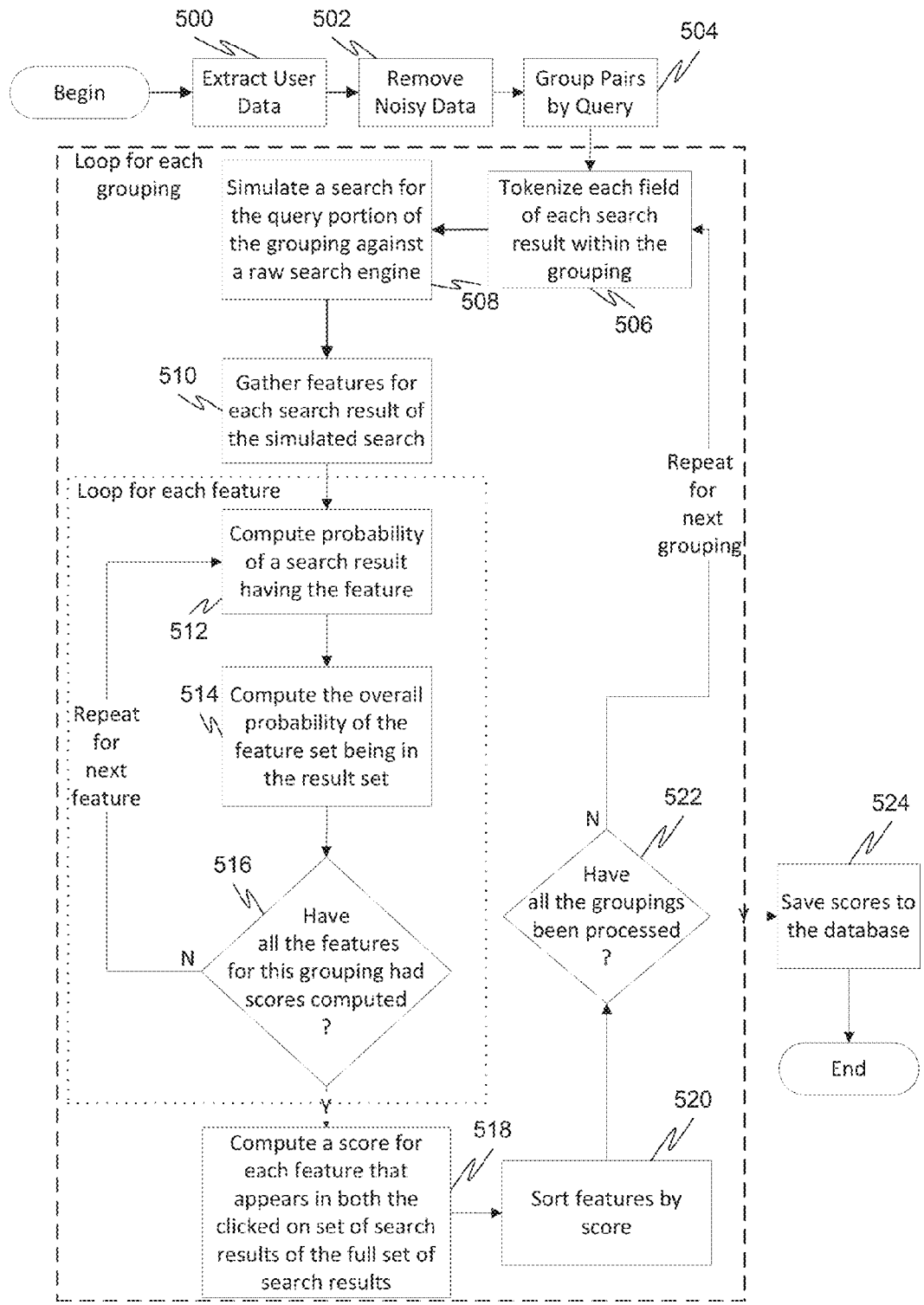
FIG. 5 is a flow diagram illustrating an example embodiment of a learning stage of a method to improve search engine results.

FIG. 5 is a flow diagram illustrating an example embodiment of a learning stage of a method to improve search engine results. It should be noted that while this flow diagram is described in terms of search engine results, these results can generally be referred to as documents as well. In an example embodiment, the documents pertain to products. In the learning stage, scores will be determined for each query (grouping of search terms) and the results stored in a database to be used later by a search engine. This stage begins at 500, where search terms and associated clicked-on results are extracted from the two recording subsystems described in FIGS. 2 and 3. Specifically, the search terms may be extracted from search term database 204 and the click-on results may be extracted from the click database 304. The result of extracting this data is a number of data pairs, comprising a query and a unique search result identification (representing the search result, such as a product). After the pairs are extracted, noisy data is removed from them at 502. This is performed because it is unknown whether the user clicked on the particular search result as a result of the search terms. There are several possible scenarios in which a user may conduct a search and subsequently click-on a result which is not related to the search. For example, the user may have two separate browser windows open, and conduct a search in one, then switch to the other and click on a search result from a previous search. Alternatively, the user may have landed on a search result by way of navigating from various user interface aspects such as categorical filters.

In one example embodiment, noisy data is removed using a heuristic to decide whether the pair is a noisy pair or not. This heuristic is that if the clicked-on search result appears within a first preset number of documents of a simulated search using the query part of the pair, then the pair is retained. If not, the pair is discarded. For example, the system may discard any pair whose query part of the pair results in a simulated search where the search result does not appear within the first 60 documents returned by the simulated search. This is useful because many users are unlikely to sift through results past the first 60 documents, and thus any clicks on search engine results beyond the first 60 document will likely be from one of the alternative scenarios described above. While it is possible that some useful data may actually be discarded through this procedure, the overall benefit outweighs the disadvantages.

At 504, the data pairs (with the noisy pairs having been removed) are grouped by query and pairs having the same search query are combined. This results in data, including pairs with the first part being a search query and the second part being a list of search result identifications representing the results clicked-on as a result of the query.

Next, the features that will be scored can be collected. This is performed as part of an overall loop traversing through each of the grouped pairs. At 506, each field of each search result within the pair is tokenized. Commonly used fields are: title, description, specifications, global trade item number (GTIN), brand, manufacturer, model number, manufacturer part number (MPN), and category. For each search result (document) the set of features used is extracted.

At 508, a search is simulated for the query portion of the pair against a raw search engine. A raw search engine is defined as a search engine result that does not use the boost term aspect described in this disclosure. At 510, features are gathered for each search result of the simulated search. The result of this is a set of features from a simulated search and the set of features from the actual search engine results clicked as stored in the pair (from 506). Both of these can be collectively referred to as the "features" for this pair.

A loop is then begun for each of these features. At 512, the probability of a search result having the feature is computed. This can be performed by dividing the number of clicked on results that contain the term by the number of clicked on results returned for the particular search query. Alternatively, the probability of the feature being present in the total set of features may be computed. The result of this is that, for each feature present in any clicked-on search result, its probability of appearing in the clicked-on documents is known.

At 514, the overall probability of the feature being in the result set, regardless of whether or not the search result has actually been clicked on or not, is computed. In other words, the full set of documents returned by the simulated search from 508 is used, and for each feature present, the probability of that feature appearing in the simulated result set is computed. Depending on the probability model, this feature may be considered to be binary values or term counts.

At 516, a score may be computed for each feature that appears in both the clicked on set of search engine results (documents) and the full set of search engine results (documents). In order to compute the scores for each feature, the normalized pointwise mutual information for each feature can be used, with respect to the search terms. The pointwise mutual information and the normalized pointwise mutual information can be computed as follows:

$$pmi(x, t) = \log_2 \frac{p(t \mid x)}{p(t)}$$

In the above formula p(t) represents the probability computed in 514, and the conditional probability of feature t given that a search result has been clicked on is represented by p(t|x). The pointwise mutual information value is computed for all features individually. Thus, t represents a single given feature. x represents the search query.

Once the pointwise mutual information value is known, this value can then be normalized by dividing by $-\log_2(p(t))$. This is one of several qays of normalizing pointwise mutual information. In this particular normalization the range of values of unnormalized pointwise mutual information is transformed from the range $(-\infty, \infty)$ to $(-\infty, 1)$. The full formula for the normalized pointwise mutual information value is $$npmi(x, t) = \frac{pmi(x, t)}{-\log_2(p(t))}$$

After obtaining this value, the final step in computing the score is to multiply it by a constant K. This value may be set to, for example, 1000. The formula is:

$$score(x, t) = K \times \frac{\log_2(p(t \mid x)) - \log_2(p(t))}{-\log_2(p(t))}$$

It should be noted that in the case of learning scores from external click data, the search engine results that were clicked on may or may not be in the target database. For the probabilities to be computed correctly, therefore, the system can either add them to the set of full documents, or match them up to documents in the target system. If a unique search result identifier is known, as in a GTIN or UPC for a product, for both the clicked-on search result in the external click data and the search result in the target system, then the click can be considered to be for the corresponding search result in the target system. In the case where either the same search result is not in the target system or no unique search result identifier is known, then the search result from the external click data can be added to the full result set. This ensures that probabilities do not exceed 1 as all clicked-on search engine results would always be a subset of the full result set.

At 518, it is determined if all the features for this pair have had scores computed. If not, then the process loops to 514. If so, then the process may proceed to 520, where the features are sorted by their score. They may be sorted in, for example, decreasing order. Sorting them prior to storage is helpful in that at query time only the higher scores may be used, and if they are presorted there is no need to resort at runtime, when time is more limited.

At 522, it is determined if all the groupings have been processed. If not, then the process loops back to 506. If so, then at 524, the scores are saved to a database. The database may be keyed from the queries themselves. Any storage engine that has an indexing capability may be used, providing that given a query, the sorted pre-computed scores can be efficiently retrieved.

Figure 6:
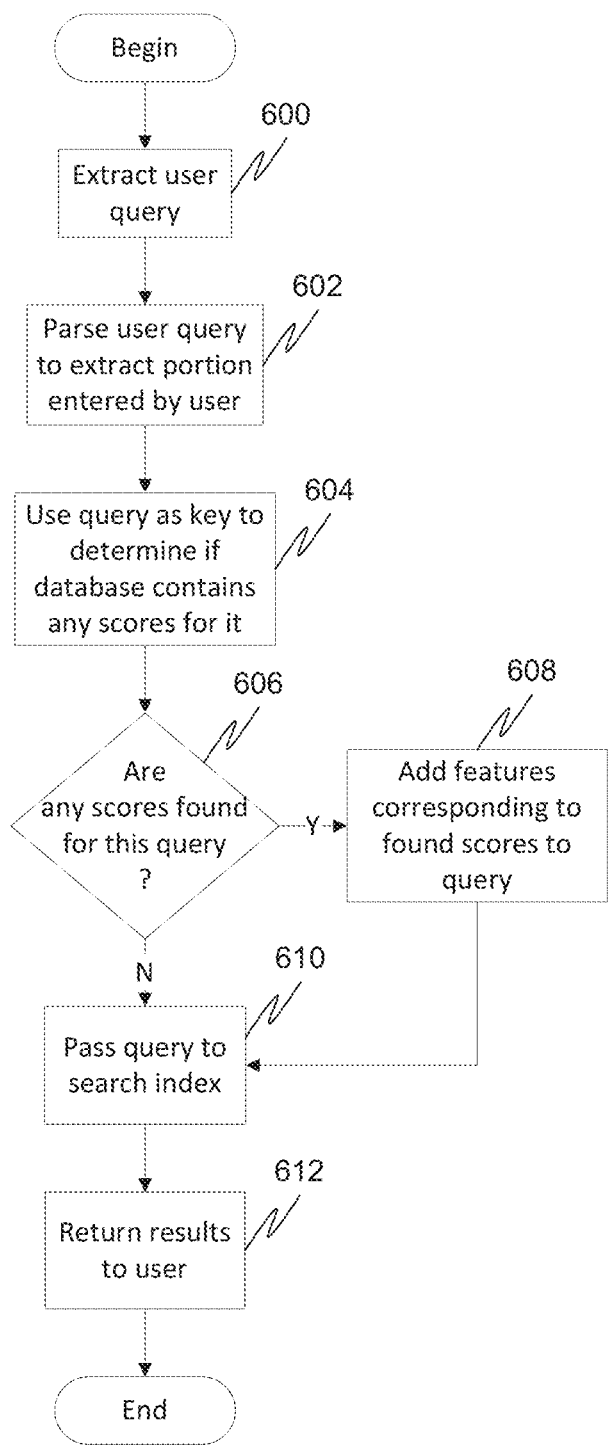
FIG. 6 is a flow diagram illustrating an example embodiment of a query stage of a method to improve search engine results.

FIG. 6 is a flow diagram illustrating an example embodiment of a query stage of a method to improve search engine results. At 600, a user query is extracted. This may be performed in a number of ways. In one example, embodiment, the user query can be extracted from a search form, such as by reading the query from the appropriate hypertext transfer protocol (HTTP) posted field.

At 602, the incoming query may be parsed to extract the portion entered by the user. The reason for this is that applications using the search engine may have added additional filtering parameters onto the query, such as a price range, which is irrelevant to the ranking. Any additional filtering can be ignored at this point, although in some example embodiments it can be used to filter the overall results later.

Once the user entered query is obtained from 602, the process proceeds to 604, where the query is used as a key to determine if a database contains any scores for it. At 606, it is determined if any scores are found in the database for this query. If so, then at 608, the features corresponding to those scores are added to the query as boost terms. In some example embodiments, not all the features are used as boost terms, in that the system may use only a preset number of features, or only features having scores above a preset value.

At 610, the query, with the addition of any boost terms, is passed to a search index. At 612, the results of the query are returned to the user.

FIGS. 7-15 depict tables showing a detailed example of enhancing product search engine results in accordance with an example embodiment. In this example, a search term "tv" has been provided. After grouping the pairs by query in 504 of FIG. 5, the result is a list of pairs, grouped by the search term. FIG. 7 depicts the first 5 pairs in accordance with an example embodiment. There could be more than 5 such pairs or less than 5 such pairs. The second column 700 represents the internal identification of the product in the database, but may be any unique identifier, including a Uniform Resource Locator (URL), which represents the product that was clicked on. In 506 of FIG. 5, the features for each document are extracted. For the first product in FIG. 7, namely the product with identification 5741702, a sample of extracted features are depicted in FIG. 8. FIG. 8 depicts a sample of extracted features in accordance with an example embodiment. Recall that these features are extracted from several different fields, such as title, description, etc. Note that while some of the features listed in FIG. 8 are clearly related to televisions, such as "pixels", others, such as "enables" do not seem to have strong associations with televisions. Still others, for example "716829981214", which is a UPC, are by definition associated with a single product. Of course, at this point in the process it does not matter what the features are. It is the job of the remainder of the process to determine which features are important and which are not.

After 508 in FIG. 5 the system has a second list of product identifiers. These are products returned by a simulation of the search term "tv." By simulation, it is meant that the program submits the search term "tv" to a raw search engine and collects the results, simulating what the user would see on their screen. FIG. 9 depicts a sample of simulated search engine results in accordance with an example embodiment.

Note that the clicked on products from the first set may or may not be in the second set as well. At 510 of FIG. 5, features are gathered for each of the products in the result in the same way as in 506 of FIG. 5. FIG. 10 depicts a sample of features gathered for a first product in a simulated search set in accordance with an example embodiment. Interestingly, this product is actually not a television at all but rather a 4-pack of wine. The reason that this was returned by the simulated search is that it also contained the term "tv" This is a good example of a problem that the process described herein can overcome.

Now that the features have all been gathered, for each feature the probability that it appears in the clicked-on products can be computed. For example, if there are 100 clicked products and the term "hdtv" appears in 70 of them, then using the document-based probability calculation the probability for "hdtv" would be 0.70. If using the alternative method, then instead of containing the number of documents that contain the word "hdtv", the number of times the term "hdtv" appears in all of the clicked on products is counted, and this number is divided by the number of times it appears in all documents in the search result.

After computing the feature probabilities in this example, the scores are obtained. FIG. 11 depicts example probabilities in accordance with an example embodiment. For brevity, only the top 10 are shown. This also correlates to 512 in FIG. 5. At 514 of FIG. 5, the probability of each feature appearing in the full result set is computed. The computations are similar to that in 512, the only difference being that now the probabilities are computed if features appear in the total search result set and not just those products that have been clicked on. FIG. 12 depicts features with the highest probability of appearing in a total search result set in accordance with an example embodiment.

Note that apart from the term "tv" itself, none of the terms with the highest probability of appearing in the clicked products are in the top 10 probabilities of appearing in the full result. In other words, all of the probabilities for those terms fall below the top 10. This will result in much higher scores for such terms, as described later.

A further interesting feature of FIG. 12 is that many of the highest scoring features are arbitrary terms such as single digit numbers, while others such as "stand" are clearly associated with a television accessory and not a television itself. It is precisely the difference in the probabilities in FIG. 11 and FIG. 12 that the process is attempting to exploit. Clearly, from the formula for the scores, a feature having a high probability in FIG. 11 and a low probability in FIG. 12 would have a very high score, since it is dividing a large number by a small number. On the other hand, a low probability in FIG. 11 and a high probability in FIG. 12 would result in a very low score. If the probabilities are roughly the same, indicating that the term is equally likely to appear in the clicked on products as the non-clicked on product, then the score will be 0 (or close to 0), meaning that it has no use whatsoever in improving the search ranking.

Now that the probabilities have been computed, the score can be computed for each term. In order to do this, first the pointwise mutual information value for each term can be calculated. FIG. 13 depicts the top 10 terms ordered by pointwise mutual information in accordance with an example embodiment. These scores can then be normalized. FIG. 14 depicts the top 10 values of normalized scores in accordance with an example embodiment. For purpose of illustration, FIG. 15 depicts the bottom 10 values of normalized scores in accordance with an example embodiment. It should be clear at this point that those with the highest normalized scores are more likely to be associated with the query "tv". Indeed, the values in FIG. 15 are all negative, indicating that they would actually make the search engine worse than not using any values at all.

All of the scores are sorted and stored in a database. At query time, an attempt is made to retrieve these presorted scores from the database. If they are found, then they are added to the search query in the form of boost queries. In the case they are not found, the search term is passed to the search engine without any boost terms.

Figure 16:
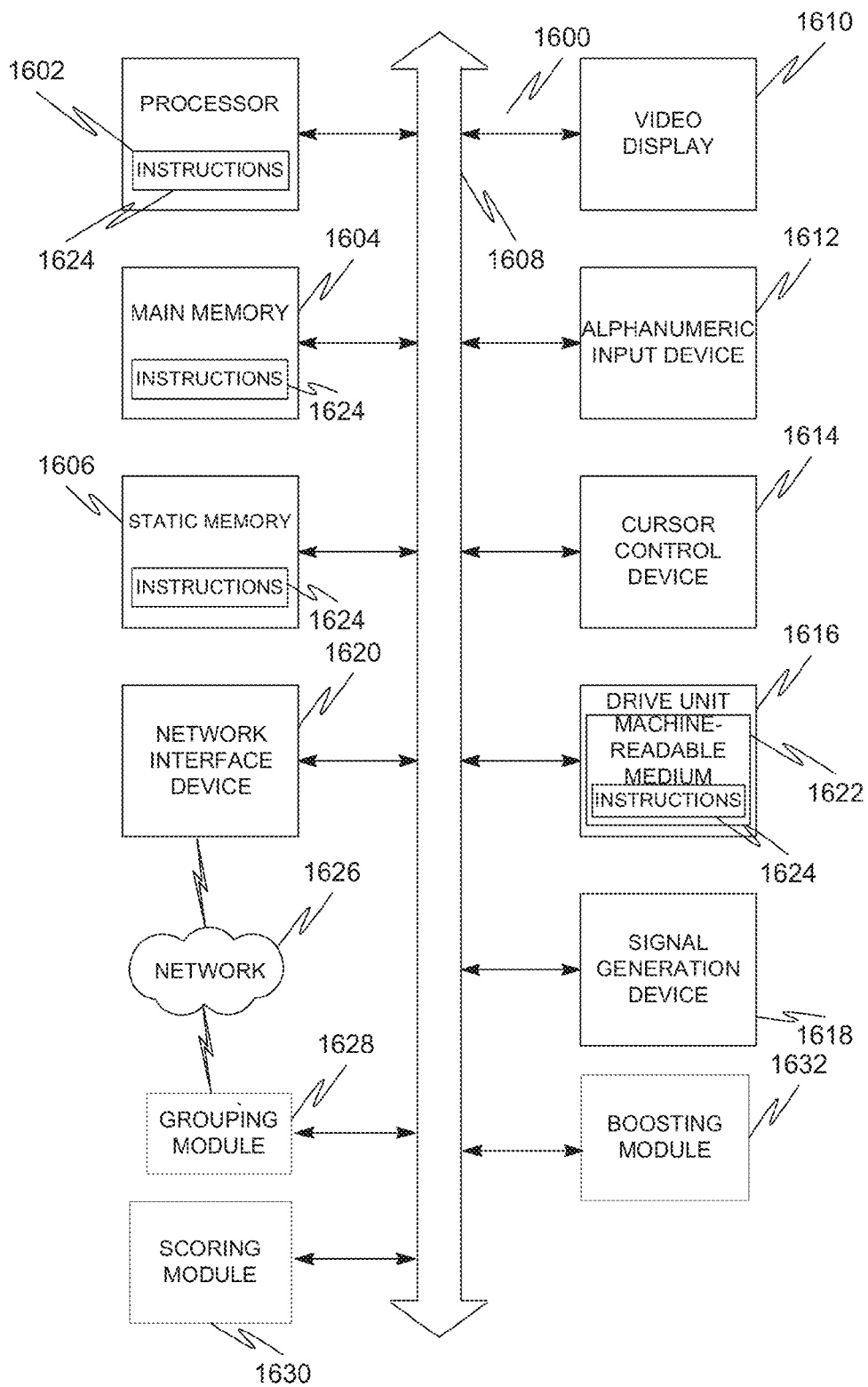
FIG. 16 shows a diagrammatic representation of machine in the example form of a computer system within which a set of instructions, for causing the machine to perform any one or more of the methodologies discussed herein, may be executed.

FIG. 16 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU), or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker), and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, with the main memory 1604 and the processor 1602 also constituting machine-readable media. The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

A grouping module 1628 may be configured to group pairs of user search history into groupings, each grouping having pairs sharing a single query, each pair containing a query searched for by a user in a search engine and a first set of search engine results that the user has clicked on for the query. A storing module 1630 may be configured to fir each grouping, tokenize one or more fields of each search result in the first set of search engine results into a first set of features; simulate a search for the single query contained in the grouping against a raw search engine, produce a second set of search engine results; gather features from the second set of search engine results into a second set of features; and for each feature in the first and/or second set of features: compute a first probability of a search result in the first set of search engine results having the feature; compute a second probability of a search result in the second set of search engine results having the feature; and compute a score for the feature based on the first probability and the second probability. A boosting module 1632 may be configured to cause search terms in future queries to be boosted based upon the computed scores for the features.

Although the inventive concepts been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for enhancing search engine results, comprising:
   retrieving user history data including one or more pairs, each pair containing a query searched for by a user in a search engine and a first set of search engine results for the query, the first set of search engine results including only results that the user has clicked on;
   grouping the pairs into groupings, each grouping having pairs sharing a single identical query;
   for each grouping:
      tokenizing one or more fields of each search result in the first set of search engine results into a first set of features, wherein each feature is a characteristic of a product that is a subject of a result in the first set of search engine results;
      simulating a search using the single identical query contained in the grouping against a raw search engine, the raw search engine not boosting the single identical query and producing a second set of search engine results different than the first set of search engine results by virtue of at least one of the second set of search engine results being new and unseen by other users;
      gathering features from the second set of search engine results into a second set of features;
      for each feature in the first or second set of features:
         computing a first probability of a search result in the first set of search engine results having the feature;
         computing a second probability of a search result in a result set comprising the first set of search engine results and the second set of search engine results having the feature;
         computing a score for the feature based on the first probability and the second probability, by computing $$\log_2 \frac{p(t|x)}{p(t)},$$

where p(t|x) is the first probability and p(t) is the second probability; and causing search terms in future queries to be boosted by adding one or more of the features based upon the computed scores for the features.

2. The method of claim 1, wherein each search engine result corresponds to a product.

3. The method of claim 1, further comprising:
sorting each feature in the first or second set of features by score; and
wherein the causing search terms in future queries to be boosted includes adding a predetermined number of highest scoring features to a future query by a user.

4. The method of claim 1, wherein the computing the score includes computing normalized pointwise mutual information for the feature.

5. The method of claim 4, wherein the computing normalized pointwise mutual information for the feature includes: computing a binary logarithm of a quotient of the first probability divided by the second probability, and normalizing the binary logarithm.

6. The method of claim 5, wherein the normalizing includes dividing the binary logarithm by a binary logarithm of the second probability.

7. The method of claim 6, wherein the scoring further comprises multiplying the normalized pointwise mutual information by a constant.

8. The method of claim 1, wherein when the user history data is received from an external source, adding the first set of search engine results to the second set of search engine results.

9. The method of claim 1, further comprising storing the scores in a database and wherein the causing search terms in future queries to be boosted includes retrieving scores from the database.

10. The method of claim 9, wherein the causing search terms in future queries to be boosted includes, for a future query received from a user, determining if the database contains scores related to terms in the query.

11. An apparatus comprising:
a processor;
a memory, coupled to the processor, containing instructions for:
retrieving user history data including one or more pairs, each pair containing a query searched for by a user in a search engine and a first set of search engine results for the query, the first set of search engine results including only results that the user has clicked on;
grouping the pairs into groupings, each grouping having pairs sharing a single identical query;
for each grouping:
tokenizing one or more fields of each search result in the first set of search engine results into a first set of features, wherein each feature is a characteristic of a product that is a subject of a result in the first set of search engine results;
simulating a search using the single identical query contained in the grouping against a raw search engine, the raw search engine not boosting the single identical query and producing a second set of search engine results different than the first set of search engine results by virtue of at least one of the second set of search engine results being new and unseen by other users;
gathering features from the second set of search engine results into a second set of features;
for each feature in the first or second set of features:
computing a first probability of a search result in the first set of search engine results having the feature;
computing a second probability of a search result in a result set comprising the first set of search engine results and the second set of search engine results having the feature;
computing a score for the feature based on the first probability and the second probability, by computing $$\log_2 \frac{p(t|x)}{p(t)},$$

where p(t|x) is the first probability and p(t) is the second probability; and causing search terms in future queries to be boosted by adding one or more of the features based upon the computed scores for the features.

12. The apparatus of claim 11, wherein the apparatus is a search engine server.

13. The apparatus of claim 11, wherein the apparatus is coupled to a search engine database.

14. The apparatus of claim 13, wherein the instructions further comprise storing the scores in the search engine database.

15. The apparatus of claim 13, wherein the instructions further comprise storing the scores in a database other than the search engine database.

16. A non-transitory machine-readable storage medium having instruction data to cause a machine to execute a method comprising: retrieving user history data including one or more pairs, each pair containing a query searched for by a user in a search engine and a first set of search engine results for the query, the first set of search engine results including only results that the user has clicked on;
grouping the pairs into groupings, each grouping having pairs sharing a single identical query;
for each grouping:
tokenizing one or more fields of each search result in the first set of search engine results into a first set of features, wherein each feature is a characteristic of a product that is a subject of a result in the first set of search engine results;
simulating a search using the single identical query contained in the grouping against a raw search engine, the raw search engine not boosting the single identical query and producing a second set of search engine results different than the first set of search engine results by virtue of at least one of the second set of search engine results being new and unseen by other users;
gathering features from the second set of search engine results into a second set of features;
for each feature in the first or second set of features:
computing a first probability of a search result in the first set of search engine results having the feature;
computing a second probability of a search result in a result set comprising the first set of search engine results and the second set of search engine results having the feature;

computing a score for the feature based on the first probability and the second probability, by computing $$\log_2 \frac{p(t|x)}{p(t)},$$

where p(t|x) is the first probability and p(t) is the second probability; and causing search terms in future queries to be boosted by adding one or more of the features based upon the computed scores for the features.

17. The machine-readable non-transitory storage medium of claim 16, wherein the method further comprises: sorting the features by score; and wherein the causing search terms in future queries to be boosted includes adding a predetermined number of highest scoring features to a future query by a user.

* * * * *

UNITED STATES PATENT AND TRADEMARK OFFICE
CERTIFICATE OF CORRECTION

PATENT NO.         : 9,569,545 B2
APPLICATION NO.    : 13/601665
DATED              : February 14, 2017
INVENTOR(S)        : Newey et al.

It is certified that error appears in the above-identified patent and that said Letters Patent is hereby corrected as shown below:

In Column 13, Line 61, in Claim 11, delete "subiect" and insert --subject-- therefor Signed and Sealed this
Tenth Day of April, 2018

Andrei Iancu
*Director of the United States Patent and Trademark Office*